(12) United States Patent
Han (10) Patent No.: US 11,750,439 B2
(45) Date of Patent: Sep. 5, 2023

(54) METHOD AND DEVICE FOR DETERMINING ROOT CAUSE OF FAULT, SERVER AND COMPUTER-READABLE MEDIUM

(71) Applicant: ZTE CORPORATION, Guangdong (CN)

(72) Inventor: Junhua Han, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 17/637,888

(22) PCT Filed: Sep. 3, 2020

(86) PCT No.: PCT/CN2020/113111
§ 371 (c)(1),
(2) Date: Feb. 24, 2022

(87) PCT Pub. No.: WO2021/043184
PCT Pub. Date: Mar. 11, 2021

(65) Prior Publication Data
US 2022/0286348 A1 Sep. 8, 2022

(30) Foreign Application Priority Data
Sep. 4, 2019 (CN) .......................... 201910832361.5

(51) Int. Cl.
*H04L 41/0631* (2022.01)
*H04L 41/0677* (2022.01)
(52) U.S. Cl.
CPC ........ *H04L 41/065* (2013.01); *H04L 41/0677* (2013.01)

(58) Field of Classification Search
CPC .......................... H04L 41/065; H04L 41/0677
(Continued)

(56) References Cited

U.S. PATENT DOCUMENTS 6,385,750 B1 * 5/2002 Kapur .............. G01R 31/31813
714/724
10,284,453 B2 * 5/2019 Bell ........................ H04L 43/16
(Continued)

FOREIGN PATENT DOCUMENTS

CN 101917297 A 12/2010
CN 102255764 A 11/2011
(Continued)

OTHER PUBLICATIONS

WIPO, International Search Report dated Nov. 19, 2020.
(Continued)

*Primary Examiner* — Melvin H Pollack
(74) *Attorney, Agent, or Firm* — Li & Cai Intellectual Property (USA) Office (57) ABSTRACT

The present disclosure provides a method and a device for determining a root cause of fault, a server and a computer-readable medium. The method for determining a root cause of fault includes: determining fault characteristic information when a fault occurs in a service, and determining a fault root cause node according to the fault characteristic information and a preset fault propagation graph, the fault propagation graph is configured to represent directed association relationships among different fault propagation nodes, and directed association relationships among a fault node, the fault propagation nodes and fault root cause nodes, and the nodes in the fault propagation graph are configured to represent the fault characteristic information.

16 Claims, 7 Drawing Sheets

(58) Field of Classification Search
USPC .......................................................... 709/224
See application file for complete search history.

(56) References Cited

U.S. PATENT DOCUMENTS

| | | | | |
|---|---|---|---|---|
| 10,373,065 | B2* | 8/2019 | Suleiman | G06N 20/00 |
| 10,503,581 | B2* | 12/2019 | Justin | G06F 11/0709 |
| 10,693,711 | B1* | 6/2020 | Garg | H04L 41/12 |
| 10,769,347 | B1* | 9/2020 | Schuermyer | G06N 20/00 |
| 10,873,533 | B1* | 12/2020 | Ismailsheriff | H04L 47/12 |
| 10,936,657 | B2* | 3/2021 | Huebner | G06N 5/022 |
| 11,086,709 | B1* | 8/2021 | Ratkovic | G06F 11/0709 |
| 2011/0231704 | A1 | 9/2011 | Ge | |
| 2012/0005533 | A1 | 1/2012 | Li | |
| 2014/0355453 | A1* | 12/2014 | Zhang | B01D 19/0404 370/242 |
| 2018/0367367 | A1* | 12/2018 | Bao | H04L 41/064 |
| 2018/0367428 | A1* | 12/2018 | Di Pietro | G06N 20/10 |
| 2019/0020497 | A1* | 1/2019 | Wang | G06N 5/022 |
| 2019/0066010 | A1 | 2/2019 | Grussing | |
| 2019/0095507 | A1* | 3/2019 | Elisseeff | G06Q 10/067 |
| 2019/0132224 | A1* | 5/2019 | Verma | H04L 43/062 |
| 2019/0158309 | A1* | 5/2019 | Park | H04L 12/2832 |
| 2019/0163549 | A1* | 5/2019 | Huang | G06N 5/003 |
| 2019/0165988 | A1* | 5/2019 | Wang | H04L 41/0631 |
| 2019/0187569 | A1* | 6/2019 | Ypma | G03F 7/70633 |
| 2019/0196460 | A1* | 6/2019 | Rosea | G05B 23/0243 |
| 2019/0196939 | A1* | 6/2019 | Lengauer | G06F 11/3495 |
| 2019/0215230 | A1* | 7/2019 | Mermoud | H04L 41/065 |
| 2019/0227860 | A1* | 7/2019 | Gefen | G06F 16/9024 |
| 2019/0235941 | A1* | 8/2019 | Bath | G06F 11/0709 |
| 2019/0324444 | A1* | 10/2019 | Celia | G05B 19/4185 |
| 2019/0363971 | A1* | 11/2019 | Mermoud | H04L 43/04 |
| 2020/0042700 | A1* | 2/2020 | Li | G06F 21/554 |
| 2020/0120109 | A1* | 4/2020 | Shu | G06K 9/6201 |
| 2020/0125653 | A1* | 4/2020 | Huang | G01D 9/00 |
| 2020/0145299 | A1* | 5/2020 | Do | H04L 41/0816 |
| 2020/0160190 | A1* | 5/2020 | Swamy | G06N 5/022 |
| 2020/0186411 | A1* | 6/2020 | Ravichandran | H04L 41/16 |
| 2020/0192344 | A1* | 6/2020 | O'Connor | H04L 41/145 |
| 2020/0210310 | A1* | 7/2020 | Srinivasan | G06F 9/5072 |
| 2020/0252310 | A1* | 8/2020 | Thampy | G06N 3/088 |
| 2020/0272923 | A1* | 8/2020 | Banerjee | H04L 41/0677 |
| 2020/0313985 | A1* | 10/2020 | Jayakumar | H04L 43/04 |
| 2020/0336384 | A1* | 10/2020 | Jha | H04L 41/12 |
| 2020/0348363 | A1* | 11/2020 | Kvam | G01R 31/343 |
| 2020/0387135 | A1* | 12/2020 | Khorasgani | G06K 9/6224 |
| 2021/0021456 | A1* | 1/2021 | Qi | H04L 41/0636 |
| 2021/0160746 | A1* | 5/2021 | Diggins | H04W 36/0083 |
| 2021/0208983 | A1* | 7/2021 | Lin | G06N 3/08 |
| 2021/0256030 | A1* | 8/2021 | Zhang | G06N 7/005 |
| 2021/0273965 | A1* | 9/2021 | Pi | G06F 21/566 |
| 2022/0311512 | A1* | 9/2022 | Magri | H04B 10/0791 |

FOREIGN PATENT DOCUMENTS

| | | | | |
|---|---|---|---|---|
| CN | 105391579 A | | 3/2016 | |
| CN | 105486976 A | | 4/2016 | |
| CN | 105786763 A | | 7/2016 | |
| CN | 110032463 A | | 7/2019 | |
| CN | 112242919 A | * | 1/2021 | G06F 9/5038 |
| WO | WO 2008000290 A1 | | 1/2008 | |
| WO | WO 2019104196 A1 | | 5/2019 | |

OTHER PUBLICATIONS

European Patent Office, EP20860951.1 Extended European Search Report dated Jul. 10, 2023.
China Patent Office, CN201910832361.5 First Office Action dated Jan. 18, 2023.

* cited by examiner

METHOD AND DEVICE FOR DETERMINING ROOT CAUSE OF FAULT, SERVER AND COMPUTER-READABLE MEDIUM

CROSS-REFERENCE TO RELATED APPLICATIONS

This is a National Phase Application filed under 35 U.S.C. 371 as a national stage of PCT/CN2020/113111, filed on Sep. 3, 2020, an application claiming the priority of Chinese Patent Application No. 201910832361.5, filed on Sep. 4, 2019, the contents of which are incorporated herein in their entirety by reference.

TECHNICAL FIELD

The present disclosure relates to the field of computer network technology.

BACKGROUND

As sizes of bearer networks become larger and larger, structures of the networks are getting more and more complex, so that positioning of a root cause of a fault when the fault occurs needs investment of a larger amount of manpower and incurs high operation and maintenance cost. Moreover, a process of determining the root cause of the fault is long, and efficiency of the process is low. Therefore, it is urgent to find a method for determining a root cause of fault effectively and quickly.

SUMMARY

In one aspect, the present disclosure provides a method for determining a root cause of fault, including: determining fault characteristic information in response to a fault occurring in a service; and determining a fault root cause node according to the fault characteristic information and a preset fault propagation graph, where the fault propagation graph is configured to represent directed association relationships among different fault propagation nodes, and directed association relationships among a fault node, the fault propagation nodes and fault root cause nodes, and the nodes in the fault propagation graph are configured to represent the fault characteristic information.

In another aspect, the present disclosure provides a device for determining a root cause of fault, including: a first determining module and a second determining module. The first determining module is configured to determine fault characteristic information in response to a fault occurring in a service; and the second determining module is configured to determine a fault root cause node according to the fault characteristic information and a preset fault propagation graph, where the fault propagation graph is configured to represent directed association relationships among different fault propagation nodes, and directed association relationships among a fault node, the fault propagation nodes and fault root cause nodes, and the nodes in the fault propagation graph are configured to represent the fault characteristic information.

In still another aspect, the present disclosure provides a server, including: one or more processors; and a storage device having one or more programs stored thereon; and when the one or more programs are executed by the one or more processors, the one or more processors perform the above method for determining a root cause of fault.

In yet another aspect, the present disclosure provides a computer-readable medium having a computer program stored thereon; and when the computer program is executed by a processor, the processor performs the above method for determining a root cause of fault.

DETAIL DESCRIPTION OF EMBODIMENTS

Exemplary embodiments of the present disclosure will be described more fully below with reference to the drawings, but the exemplary embodiments described herein may be embodied in different forms and should not be interpreted as being limited to embodiments described herein. Rather, the embodiments are provided to make the present disclosure thorough and complete, and are intended to enable those of ordinary skill in the art to fully understand the scope of the present disclosure.

The term "and/or" used herein includes one associated listed item or any and all combinations of one or more of the associated listed items.

The terms used herein are merely used to describe specific embodiments, and are not intended to limit the present disclosure. As used herein, "a" and "the" which indicate a singular form are intended to include a plural form, unless expressly stated in the context. It should be further understood that the term(s) "comprise" and/or "be made of" used herein indicate(s) the presence of the described features, integers, operations, elements and/or components, but do not exclude the presence or addition of one or more other features, integers, operations, elements, components and/or combinations thereof.

The embodiments of the present disclosure can be described with reference to plans and/or cross-sectional views with the aid of idealized schematic diagrams of the present disclosure. Accordingly, the exemplary drawings may be modified according to manufacturing techniques and/or tolerances. The embodiments are not limited to those illustrated by the drawings, but include modifications to configuration formed based on a manufacturing process. Thus, regions shown in the drawings are illustrative, and shapes of the regions shown in the drawings illustrate specific shapes of regions of elements, but are not intended to make limitations.

Unless otherwise defined, all terms (including technical and scientific terms) used herein have the same meaning as commonly understood by those of ordinary skill in the art. It should be further understood that terms, such as those defined in commonly used dictionaries, should be interpreted as having a meaning that is consistent with a meaning in the context of the related technology and the background of the present disclosure, and should not be interpreted in an idealized or overly formal sense unless expressly so defined herein.

Existing methods for determining a root cause of fault are mainly classified into the following three categories.

1) Root causes of faults are determined manually with a tool, that is, a conventional method for determining a root cause of fault. The conventional method mainly adopts manual analysis, with an aid of data collection by the tool. In general, related data is first collected, and then is subjected to manual analysis, investigation and positioning are performed step by step, and finally a conclusion is obtained. The conventional method has disadvantages that the method mainly relies on knowledge and experience of experts, is hard to be replicated and incurs high labor cost, a process of positioning a root cause of fault is long, and efficiency of the process is low.

2) The root causes of faults are determined based on rules. The method mainly includes summarizing knowledge and experience of operation and maintenance experts, obtaining corresponding diagnosis processes and diagnosis rules, and forming a strategy base and a rule base. According to differences between bearer services and service faults, corresponding fault diagnosis strategies and rules are made to determine a root cause of fault. The method has advantages that the knowledge and experience of the operation and maintenance experts can be well accumulated to be embodied in specific fault diagnosis strategies and rules, and automatic investigation and positioning of faults can be realized. However, the method has disadvantages that the method mainly relies on manual summarization of the rules, the investigation and positioning need to be performed step by step, a positioning period is long, and a system does not have self-learning capability.

3) The root causes of faults are determined based on a neural network. The method converts an issue of determining a root cause of fault into a classification issue suitable for being solved by the neural network, and is a data-driven method for determining a root cause of fault. Specifically, a training data set is formed by labeling fault data, and then a neural network model is trained to be endowed with capability to determine a root cause of fault. The method relies on large amount of high-quality labeled data, and has a disadvantage of relatively high requirements on the data.

Figure 1:
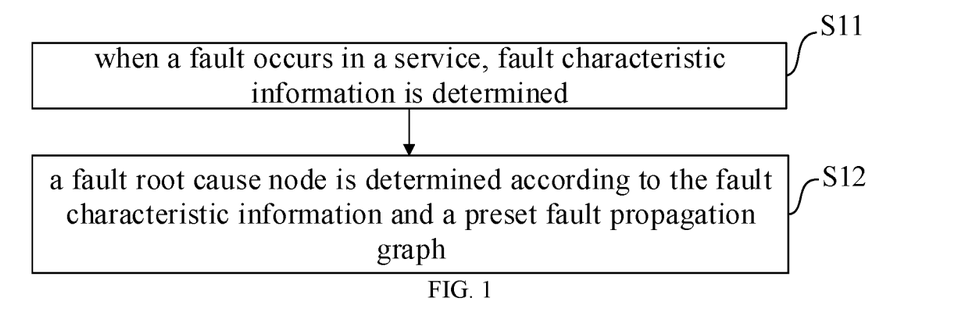
FIG. 1 is a flowchart illustrating a method for determining a root cause of fault according to the present disclosure.

FIG. 1 is a flowchart illustrating a method for determining a root cause of fault according to the present disclosure. The method for determining a root cause of fault according to the present disclosure is described in detail below with reference to FIG. 1. As shown in FIG. 1, the method includes operations S11 and S12.

In the operation S11, when a fault occurs in a service, fault characteristic information is determined.

The fault characteristic information may include: the service where the fault occurs, a fault type, and an event related to the fault. The service where the fault occurs may include an L2VPN service, an L3VPN service, etc. The fault type may include packet loss of service, interruption of service, etc., and may be identified by using an existing service fault identification solution, or may be manually input. The event related to the fault is acquired according to a path of the service where the fault occurs: the path of the service where the fault occurs may be first restored according to configuration information of the service where the fault occurs and state information reported by the service where the fault occurs, and then the event related to the fault on the path of the service where the fault occurs is collected. The event related to the fault may include: an alarm, a notification, a performance exception, a configuration exception, a log exception, etc. After being acquired, the event related to the fault is standardized for being used in subsequent calculation of a fault root cause probability.

In the operation S12, a fault root cause node is determined according to the fault characteristic information and a preset fault propagation graph.

The fault propagation graph belongs to a knowledge graph which is a graphic data structure and consists of nodes (points) and edges, each node represents an entity existing in the real world, each edge represents a relationship between the entities, and information such as entities, concepts, attributes, time and relationships is included. The fault propagation graph expresses relationships in fault propagation by defining different types of nodes and edges. Specifically, the fault propagation graph is configured to represent directed association relationships among different fault propagation nodes, and directed association relationships among a fault node, the fault propagation nodes and fault root cause nodes. The nodes in the fault propagation graph are configured to represent the fault characteristic information, and include: the fault node configured to represent the fault type, the fault root cause nodes configured to represent fault root cause types, and the fault propagation nodes configured to represent events related to the fault types.

A fault node corresponds to a specific service fault and is a central starting point of a whole fault propagation graph. A fault root cause node corresponds to a specific fault root cause type and is a final result node of fault positioning. The fault propagation nodes correspond to various event nodes before and after occurrence of a fault, and are intermediate nodes in the fault propagation. When a fault occurs, the fault begins from the fault root cause node, passes through the fault propagation nodes, and arrives the fault node. For positioning a root cause of the fault, a positioning process may begin from the fault node through the fault propagation nodes until the fault root cause node is found.

According to the present disclosure, the association relationships are cause relationships, and have directions which are represented by arrows in the fault propagation graph, and attributes of an association relationship include name configured to represent "cause" or "lead to", for example, an association relationship between Node A and Node B is that Node A leads to Node B.

It should be noted that fault propagation graphs may be classified according to the fault types, that is, one of the fault types corresponds to one of the fault propagation graphs. A fault propagation graph corresponding to each fault type is generated in an initialization stage, the fault propagation graph is obtained after knowledge extraction of knowledge and experience of operation and maintenance, and a specific process of generating the fault propagation graph will be described in detail later with reference to FIG. 5. The fault propagation graph may be stored in a plurality of ways including, but being not limited to, a graph database, a relational database, and a file including a graph data structure, etc., and the present disclosure takes a case where the fault propagation graph is stored in a graph database Orient DB as an example.

Figure 3:
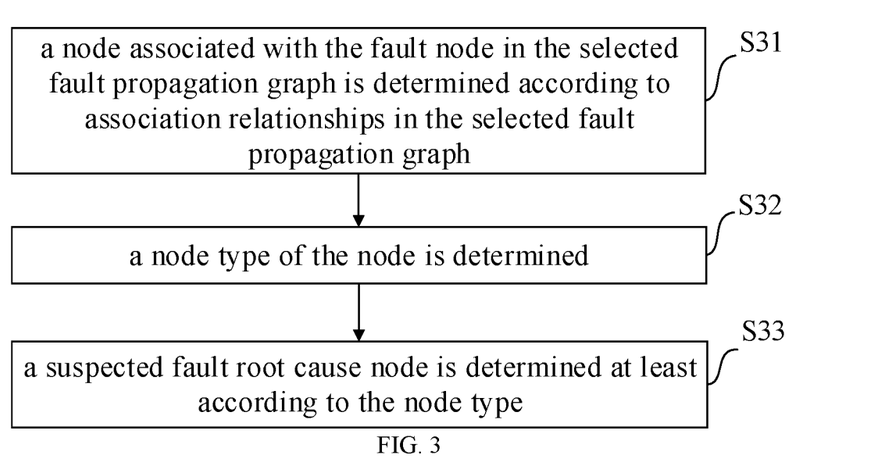
FIG. 3 is a flowchart of determining a fault root cause node according to the present disclosure.

A specific implementation of determining the fault root cause node according to the fault characteristic information and the preset fault propagation graph will be described in detail later with reference to FIG. 3.

It can be seen from the operations S11 and S12 that, when the fault occurs in the service, the fault characteristic information is determined, and the fault root cause node is determined according to the fault characteristic information and the fault propagation graph. With the method provided by the present disclosure, the root cause of the fault is found by using the fault propagation graph, so that a period of determining the root cause of the fault can be shortened, and efficiency of accuracy of positioning of the root cause of the fault can be increased. The method for determining a root cause of fault provided by the present disclosure eliminates the need for manual work, reduces labor cost, does not have a high requirement on data, and is easy to implement.

Figure 2:
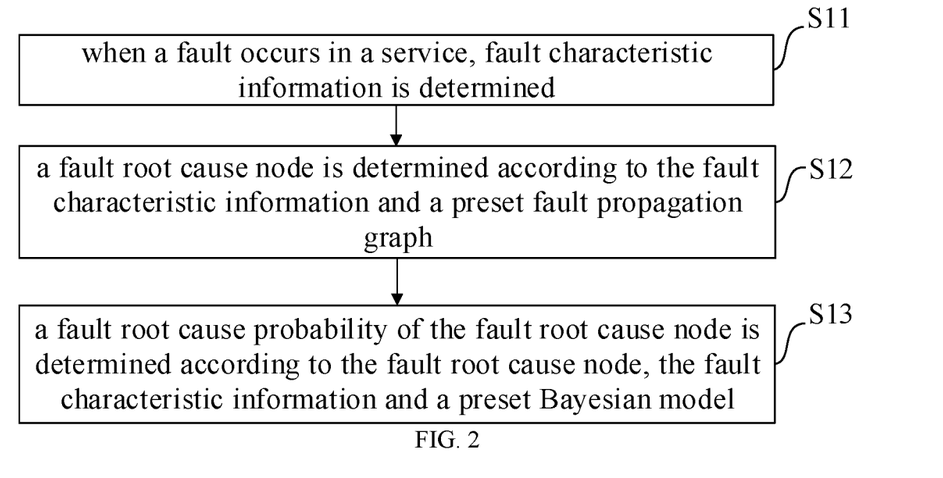
FIG. 2 is another flowchart illustrating a method for determining a root cause of fault according to the present disclosure.

FIG. 2 is another flowchart illustrating a method for determining a root cause of fault according to the present disclosure. As shown in FIG. 2, the method for determining a root cause of fault according to the present disclosure includes operations S11 to S13. The operations S11 and S12 in FIG. 2 are substantially the same as the operations S11 and S12 described with reference to FIG. 1, and thus are not repeatedly described here. After the fault root cause node is determined according to the fault characteristic information and the preset fault propagation graph (i.e., the operation S12), the method further includes the operation S13.

In the operation S13, a fault root cause probability of the fault root cause node is determined according to the fault root cause node, the fault characteristic information and a preset Bayesian model.

Figure 6:
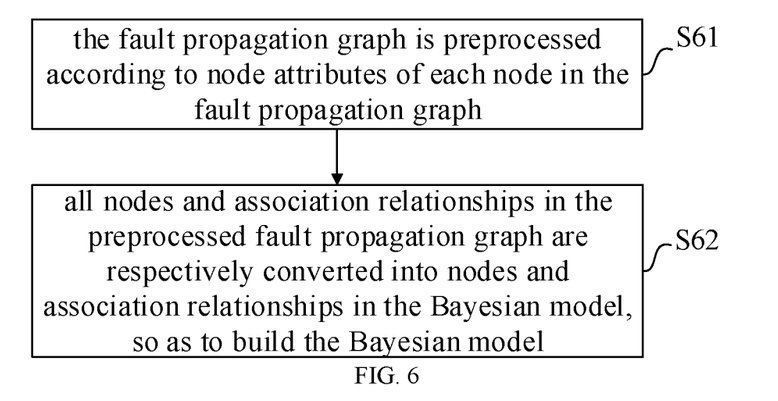
FIG. 6 is a flowchart of building a Bayesian model according to the present disclosure.

A Bayesian model is a probabilistic model, and is a graphical model based on probabilistic reasoning, and a specific process of building the Bayesian model will be described in detail later with reference to FIG. 6. The Bayesian model is a Directed Acyclic Graph (DAG), and consists of nodes representing variables, and directed edges connecting the nodes. The nodes represent random variables, the directed edges between the nodes represent relationships between the nodes (from a patent node to a child node), a conditional probability is configured to express relationship strength, and a prior probability is used for information expression on a node which has no parent node.

In the initialization stage, one Bayesian model is built for each fault propagation graph, and the Bayesian model and model parameters thereof are stored, that is, each fault type corresponds to one Bayesian model. It should be noted that the Bayesian model needs to be trained with training data after being built. The training data may come from accumulated historical statistics which are records of all historical fault information, which includes fault types, fault root cause types, fault-related events (including alarms, notifications, performance exceptions, configuration exceptions, log exceptions, etc.). In order to generate the training data, the historical statistics of faults may be standardized. Specifically, each fault corresponds to one row in the records, each dimension of the fault characteristic information corresponds to one column in the records, with 1 representing existence, and 0 representing nonexistence. The Bayesian model is trained after the standardized training data is obtained.

The Bayesian model may be stored in a plurality of ways including, but being not limited to, serializing objects with a pickle module provided by Python and storing in a magnetic disk in a file in PMML format.

In the operation S13, a corresponding Bayesian model is selected, information such as the fault root cause node, the fault type, and the event related to the fault is input to the selected Bayesian model, and the fault root cause probability of the fault root cause node is output after probabilistic reasoning by the Bayesian model.

When the fault occurs in the service, the fault characteristic information is determined, the fault root cause node is determined according to the fault characteristic information and the fault propagation graph, and the fault root cause probability of the fault root cause node is determined according to the fault root cause node, the fault characteristic information and the preset Bayesian model. By using the Bayesian model to convert an issue of positioning of the root cause of the fault into a machine learning issue, learning and probabilistic reasoning can be well performed based on the statistics, and the process of determining the root cause of the fault can take full advantage of a machine learning algorithm. The fault propagation graph is used to find the root cause of fault, and then the Bayesian model is used to perform reasoning to directly obtain the probability of the root cause of the fault. Thus, the period of determining the root cause of the fault is further shortened, and the efficiency and the accuracy of the positioning of the root cause of the fault are further increased.

According to the present disclosure, after the fault root cause probability of the fault root cause node is determined according to the fault root cause node, the fault characteristic information and the preset Bayesian model (i.e., the operation S13), the method for determining a root cause of fault may further include the following operation: sorting, according to fault root cause probabilities, fault root cause nodes corresponding thereto in an order, and displaying the order and the fault root cause probabilities of all the fault root cause nodes in the order. In this operation, the corresponding fault root cause nodes may be sorted in descending order of the fault root cause probabilities, and the order and the fault root cause probabilities of all the fault root cause nodes in the order are displayed. The displaying may be implemented in a plurality of ways including, but being not limited to, displaying in a list, and displaying in text form.

According to the present disclosure, the operation in which the fault root cause node is determined according to the fault characteristic information and the preset fault propagation graph (i.e., the operation S12) includes: selecting a fault propagation graph, a fault node in which is matched with the fault type, from all the preset fault propagation graphs, and determining the fault root cause node according to the selected fault propagation graph.

According to the present disclosure, the operation in which the fault root cause probability of the fault root cause node is determined according to the fault root cause node, the fault characteristic information and the preset Bayesian model (i.e., the operation S13) includes: selecting a Bayesian model corresponding to the selected fault propagation graph from all the preset Bayesian models, and determining the fault root cause probability of the fault root cause node according to the fault root cause node, the fault type, the event related to the fault and the selected Bayesian model.

A process of determining the fault root cause node according to the selected fault propagation graph is described in detail below with reference to FIG. 3. FIG. 3 is a flowchart of determining a fault root cause node according to the present disclosure. As shown in FIG. 3, the operation of determining the fault root cause node according to the selected fault propagation graph includes operations S31 to S33.

In the operation S31, a node associated with the fault node in the selected fault propagation graph is determined according to association relationships in the selected fault propagation graph.

The association relationships used in this operation are association relationships related to the fault node, and include an association relationship between the fault node and the fault root cause node, and an association relationship between the fault node and a fault propagation node.

In the operation S32, a node type of the node is determined.

In the fault propagation graph, the node type may include a fault node, a fault root cause node, and a fault propagation node. Since merely one fault node exists in the fault propagation graph, in this operation, the node type of the node associated with the fault node is the fault root cause node or the fault propagation node.

In the operation S33, a suspected fault root cause node is determined at least according to the node type.

The suspected fault root cause node is a fault root cause node in the selected fault propagation graph, and the number of the suspected fault root cause nodes is less than that of the fault root cause nodes in the selected fault propagation graph. That is, the suspected fault root cause node is a part of all fault root cause nodes in the whole fault propagation graph.

In this operation, if the node type of the node (i.e., the node associated with the fault node) is the fault root cause node, the node is determined to be the suspected fault root cause node, that is, if the node type of the node is the fault root cause node, a search for nodes in the fault propagation graph is terminated. If the node type of the node (i.e., the node associated with the fault node) is the fault propagation node, the suspected fault root cause node is determined according to node attributes of the node, that is, if the node type of the node is the fault propagation node, a search for an associated node in the fault propagation graph is continued.

Figure 4:
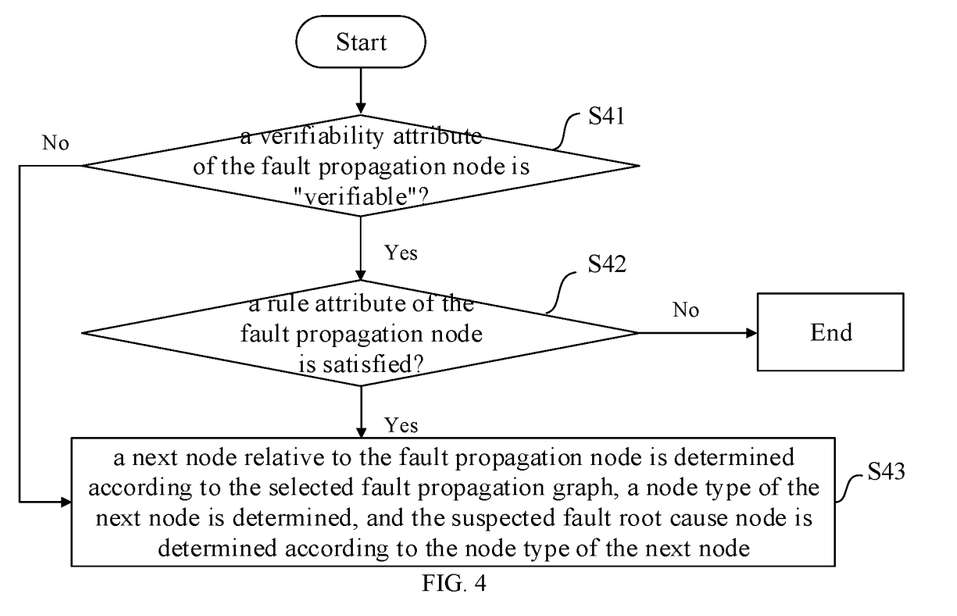
FIG. 4 is a flowchart of determining a suspected fault root cause node according to the present disclosure.

A specific implementation of determining the suspected fault root cause node according to the node attributes of the fault propagation node will be described in detail later with reference to FIG. 4.

It should be noted that, if the suspected fault root cause node is determined according to the operations S31 to S33, the operation in which the fault root cause probability of the fault root cause node is determined according to the fault root cause node, the fault characteristic information and the preset Bayesian model (i.e., the operation S13) includes: determining a fault root cause probability of the suspected fault root cause node according to the suspected fault root cause node, the fault type, the event related to the fault and the selected Bayes model. That is, the suspected fault root cause node is input to the Bayes model in the operation S13.

Through the operations of S31 to S33, the fault root cause node which may cause the current fault in the fault propagation graph can be purposefully found, and instead of all the fault root cause nodes in the fault propagation graph, the found fault root cause node is used as an input variable to the Bayesian model, so that computational complexity of the Bayesian model can be reduced, and time for reasoning by the Bayesian model can be shortened, thereby further increasing the efficiency of the positioning of the root cause of the fault.

A process of determining the suspected fault root cause node according to the node attributes of the fault propagation node is described in detail below with reference to FIG. 4. FIG. 4 is a flowchart of determining a suspected fault root cause node according to the present disclosure. It should be noted that the process of determining the suspected fault root cause node shown in FIG. 4 is for a fault propagation node. As shown in FIG. 4, the process of determining the suspected fault root cause node according to the node attributes of the fault propagation node includes operations S41 to S43.

In the operation S41, it is determined whether a verifiability attribute of the fault propagation node is "verifiable", the operation S42 is performed if the verifiability attribute of the fault propagation node is "verifiable"; otherwise the operation S43 is performed.

Attributes of a node include: 1. name (Name), which represents a name of the node; 2. verifiability (isVerify), which represents whether the node can be verified through a specific rule, with 0 indicating that the node is unverifiable, and 1 indicating that the node is verifiable, and for a node whose verifiability attribute is "verifiable", a verification rule should be given; 3. rule (Rule), if the verifiability attribute of the node is "verifiable", it needs to be determined whether the node satisfies a corresponding rule.

If the verifiability attribute of the fault propagation node is determined to be "verifiable", whether the fault propagation node satisfies a rule thereof is then determined. If the fault propagation node fails to satisfy the rule thereof, the search for nodes is terminated; and if the fault propagation node satisfies the rule, a search for a next node is carried out, and the suspected fault root cause node is determined according to a node type of the next node, so as to find all suspected root cause nodes.

In the operation S42, it is determined whether a rule attribute of the fault propagation node is satisfied, the operation S43 is performed if the rule attribute of the fault propagation node is satisfied; otherwise the process is ended, that is, determination of a next node relative to the fault propagation node is not carried out.

In the operation S43, a next node relative to the fault propagation node is determined according to the selected fault propagation graph, a node type of the next node is determined, and the suspected fault root cause node is determined according to the node type of the next node.

It can be seen from the operations S41 to S43 that all possible fault root cause nodes can be found based on a search algorithm of the fault propagation graph. If the node type of the node is the fault propagation node, the node attributes of the fault propagation node are first determined, and if the verifiability attribute included in the node attributes represents that the node is verifiable, it is determined based on the rule of the node included in the node attributes whether the node satisfies the rule. If the node fails to satisfy the rule, the search for nodes in the fault propagation graph is terminated; and if the node satisfies the rule, the search for the next node is carried out in the fault propagation graph until all fault propagation nodes which satisfy the rule thereof are traversed, so as to find all suspected fault root cause nodes.

The above operations are illustrated below by taking a scenario of packet loss of a L3VPN service as an example, and an Orient DB graph database is used to store a fault propagation graph of the packet loss of the L3VPN service in the scenario. The fault node corresponds to a node where the packet loss of the L3VPN service occurs, and the fault propagation nodes include nodes where packet loss of a forwarding queue, an out-of-limit alarm of bandwidth utilization, an out-of-limit alarm of CPU utilization, an error alarm of a critical chip, an out-of-limit alarm of temperature of a critical chip and the like occur. The fault root cause nodes include nodes where a fan failure, blocking of an air duct, temperature anomaly of a machine room, unreasonable setting of a fan speed, a rapid increase of external flow, an MAC configuration conflict and the like occur.

Taking a case where the nodes where "packet loss of a forwarding queue" and "an out-of-limit alarm of bandwidth utilization" occur are the fault propagation nodes as an example, a verifiability attribute of the node where "packet loss of a forwarding queue" occurs is "unverifiable", and a node whose verifiability attribute is "unverifiable" is merely used for supporting a search process. A verifiability attribute of the node where "an out-of-limit alarm of bandwidth utilization" occurs is "verifiable", and a rule of the node is: searching to determine whether the out-of-limit alarm of bandwidth utilization exists. If the out-of-limit alarm of bandwidth utilization exists, the rule is satisfied, and the fault root cause node may be further searched for.

Scripts of the corresponding rule are as follows:
update Propagation set isVerify=false where name="packet loss of a forwarding queue" update Propagation set isVerify=true where name="an out-of-limit alarm of bandwidth utilization"
update Propagation set rule="alarm_systemtype==4613 and (alarm_code==1633 or alarm_code==1634)" where name="an out-of-limit alarm of bandwidth utilization"

If the above rule is satisfied, a search for a corresponding node for the node needs to be continued according to the association relationships (i.e., cause-effect directions) of the node until the fault root cause node is found.

Figure 5:
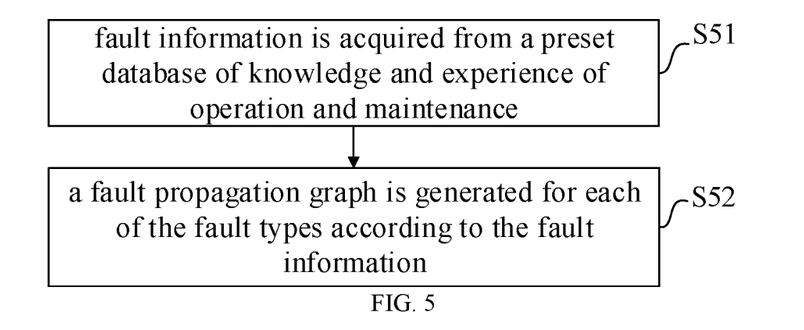
FIG. 5 is a flowchart of generating a fault propagation graph according to the present disclosure.

A process of generating the fault propagation graph is described in detail below with reference to FIG. 5. FIG. 5 is a flowchart of generating a fault propagation graph according to the present disclosure. As shown in FIG. 5, an operation of generating the fault propagation graph includes operations S51 and S52.

In the operation S51, fault information is acquired from a preset database of knowledge and experience of operation and maintenance.

In this operation, knowledge extraction is first performed on the database of knowledge and experience of operation and maintenance to obtain the fault information, which includes the fault types, the fault root cause types, the events related to the fault types (including alarms, notifications, performance exceptions, configuration exceptions, log exceptions, etc.), and association relationships among the fault types, the fault root cause types and the events related to the fault types.

In the operation S52, a fault propagation graph is generated for each of the fault types according to the fault information.

According to the present disclosure, the fault type corresponds to the fault node, the fault root cause types correspond to the fault root cause nodes, the events related to the fault types correspond to the fault propagation nodes, and a directed fault propagation graph is generated according to the association relationships among the fault types, the fault root cause types and the events related to the fault types.

Through the operations S51 to S52, the knowledge graph technology is adopted to construct a knowledge graph of fault propagation to represent and store the fault propagation graph. Specifically, relationships in fault propagation are expressed by defining the different types of nodes, the association relationships among the nodes, and attributes of the nodes. By adopting the fault propagation graph and the knowledge graph technology, the knowledge and experience of the operation and maintenance experts can be well represented and stored, and the positioning of the root cause of the fault takes full advantage of the knowledge and experience of the operation and maintenance experts, thereby increasing the accuracy of the positioning of the root cause of the fault.

Figure 9:
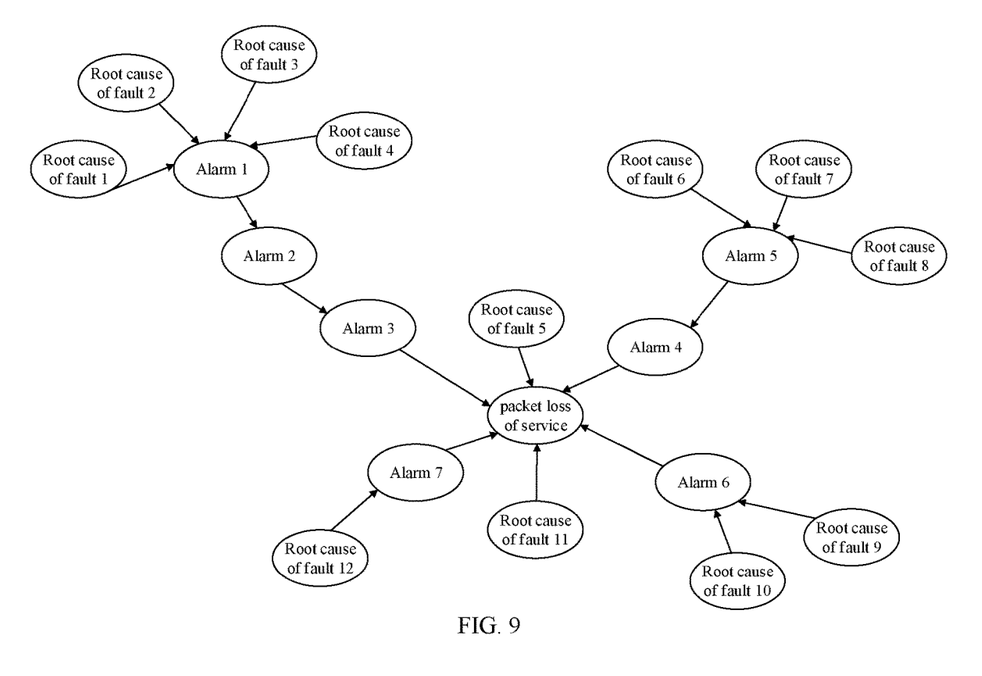
FIG. 9 is an exemplary fault propagation graph according to the present disclosure.

FIG. 9 is an exemplary fault propagation graph for the fault type of "packet loss of service", and the fault propagation graph includes 12 fault root cause nodes, and is illustrated by taking an alarm event as an example. Apparently, it should be known by those of ordinary skill in the art that the fault propagation graph may be illustrated by taking an even of another type as an example.

According to the present disclosure, the Bayesian model is generated according to the fault propagation graph. FIG. 6 is a flowchart of building a Bayesian model according to the present disclosure. A process of building the Bayesian model is described in detail below with reference to FIG. 6. As shown in FIG. 6, an operation of building the Bayesian model includes operations S61 and S62.

In the operation S61, the fault propagation graph is preprocessed according to node attributes of each node in the fault propagation graph.

Since each node in a Bayesian network represents a random variable, if a node in the fault propagation graph cannot be represented by a random variable, the information about such node needs to be removed. According to the present disclosure, a structure of the fault propagation graph may be adjusted according to verifiability attributes of the nodes.

In the operation S62, all nodes and association relationships in the preprocessed fault propagation graph are respectively converted into nodes and association relationships in the Bayesian model, so as to build the Bayesian model.

Figure 7:
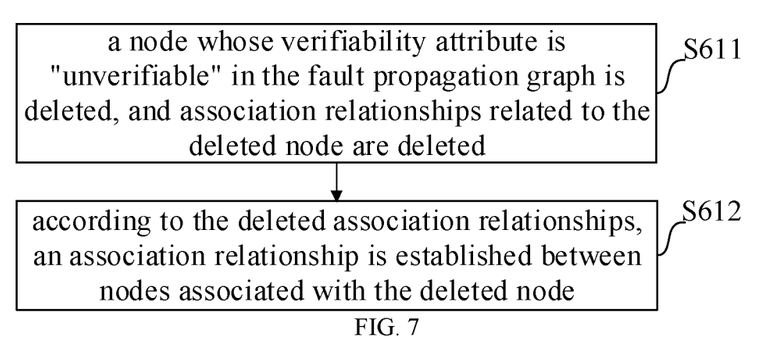
FIG. 7 is a flowchart of preprocessing a fault propagation graph according to the present disclosure.

According to the present disclosure, as shown in FIG. 7, the operation in which the fault propagation graph is preprocessed according to the node attributes of each node in the fault propagation graph (i.e., the operation S61) includes operations S611 and S612.

In the operation S611, a node whose verifiability attribute is "unverifiable" in the fault propagation graph is deleted, and association relationships related to the deleted node are deleted.

In the operation S612, according to the deleted association relationships, an association relationship is established between nodes associated with the deleted node.

If a verifiability attribute of a node in the fault propagation graph is "unverifiable", the node is deleted, and the association relationships (i.e., the edges in the fault propagation graph) related to the node also needs to be adjusted after the node is deleted. A principle of adjustment of the association relationships is deleting the association relationships related to the deleted node, and establishing, according to the deleted association relationships, an association relationship between the nodes which are respectively related to the deleted node, so as to obtain the preprocessed fault propagation graph.

For clarify the technical solutions of the present disclosure, a method for preprocessing the fault propagation graph is described in detail below with reference to FIG. 8A and FIG. 8B.

Figure 8A:
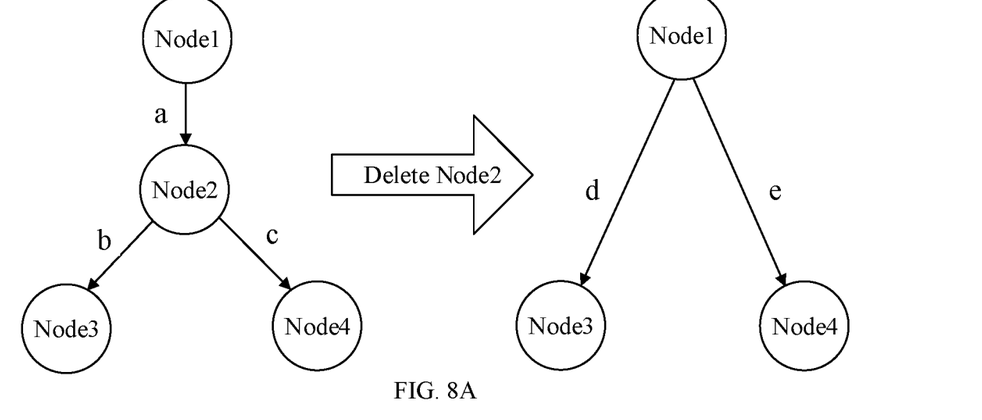
FIGS. 8A and 8B are schematic diagrams illustrating deletion of a node and association relationships thereof from a fault propagation graph according to the present disclosure.
Figure 8B:
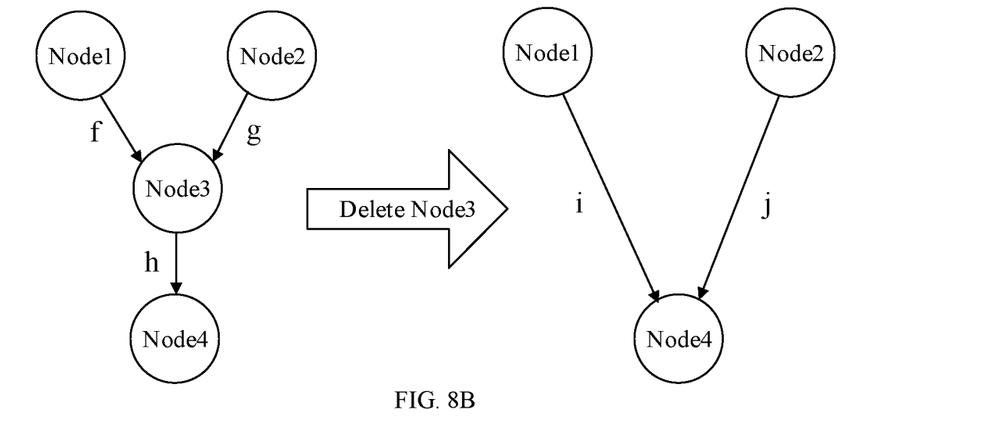

FIGS. 8A and 8B are schematic diagrams illustrating deletion of a node and association relationships thereof from a fault propagation graph according to the present disclosure.

As shown in FIG. 8A, in a case where a verifiability attribute of a fault propagation node (Node 2) in a fault propagation graph is "unverifiable", in a process of preprocessing the fault propagation graph, Node 2 and association relationships a, b and c related to Node 2 are deleted from the fault propagation graph, association relationship d is established between Node 1 and Node 3 which are related to Node 2 according to association relationships a and b, and association relationship e is established between Node 1 and Node 4 which are related to Node 2 according to association relationships a and c.

As shown in FIG. 8B, in a case where a verifiability attribute of a fault propagation node (Node 3) in a fault propagation graph is "unverifiable", in a process of preprocessing the fault propagation graph, Node 3 and association relationships f, g and h related to Node 3 are deleted from the fault propagation graph, association relationship i is established between Node 1 and Node 4 which are related to Node 3 according to association relationships f and h, and association relationship j is established between Node 2 and Node 4 which are related to Node 3 according to association relationships g and h.

Figure 10:
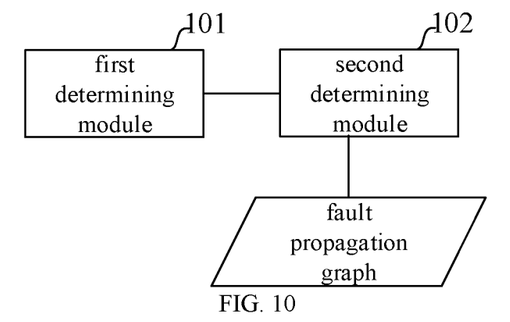
FIG. 10 is a schematic structural diagram of a device for determining a root cause of fault according to the present disclosure.

The present disclosure further provides a device for determining a root cause of fault. FIG. 10 is a schematic structural diagram of a device for determining a root cause of fault according to the present disclosure. As shown in FIG. 10, the device for determining a root cause of fault includes a first determining module 101 and a second determining module 102.

The first determining module 101 is configured to determine fault characteristic information when a fault occurs in a service.

The second determining module 102 is configured to determine a fault root cause node according to the fault characteristic information and a preset fault propagation graph. The fault propagation graph is configured to represent directed association relationships among different fault propagation nodes, and directed association relationships among a fault node, the fault propagation nodes and fault root cause nodes. The nodes in the fault propagation graph are configured to represent the fault characteristic information.

Figure 11:
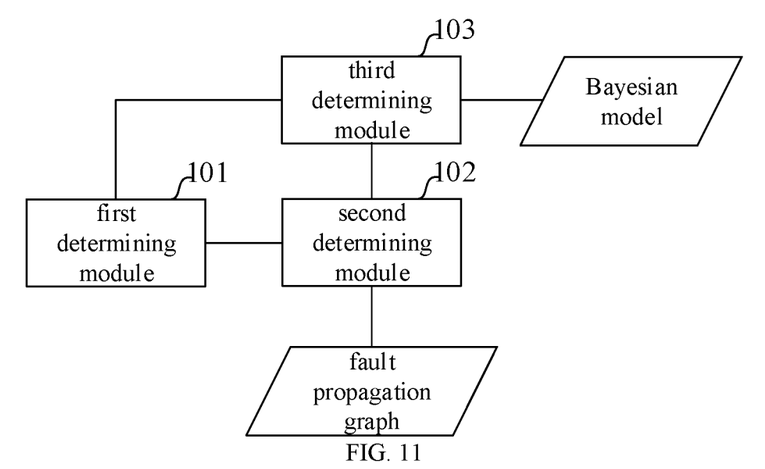
FIG. 11 is another schematic structural diagram of a device for determining a root cause of fault according to the present disclosure.

FIG. 11 is another schematic structural diagram of a device for determining a root cause of fault according to the present disclosure. As shown in FIG. 11, in addition to including the first determining module 101 and the second determining module 102 described with reference to FIG. 10, the device for determining a root cause of fault further includes a third determining module 103 configured to determine a fault root cause probability of the fault root cause node according to the fault root cause node, the fault characteristic information, and a preset Bayesian model.

According to the present disclosure, the device for determining a root cause of fault may further include a sorting and displaying module (not shown) configured to sort, according to fault root cause probabilities, fault root cause nodes corresponding thereto in an order, and display the order and the fault root cause probabilities of all the fault root cause nodes in the order.

According to the present disclosure, the first determining module 101 is further configured to determine the service where the fault occurs and a fault type, determine a path of the service where the fault occurs, and acquire an event related to the fault according to the path.

According to the present disclosure, the second determining module 102 is further configured to select a fault propagation graph, a fault node in which is matched with the fault type, from all the preset fault propagation graphs, and determine the fault root cause node according to the selected fault propagation graph.

According to the present disclosure, the third determining module 103 is further configured to select a Bayesian model corresponding to the selected fault propagation graph from all the preset Bayesian models, and determine the fault root cause probability of the fault root cause node according to the fault root cause node, the fault type, the event related to the fault and the selected Bayesian model.

According to the present disclosure, the second determining module 102 is further configured to determine a node associated with the fault node in the selected fault propagation graph according to association relationships in the selected fault propagation graph, determine a node type of the node, and determine a suspected fault root cause node at least according to the node type. The suspected fault root cause node is a fault root cause node in the selected fault propagation graph, and the number of the suspected fault root cause nodes is less than that of the fault root cause nodes in the selected fault propagation graph.

According to the present disclosure, the third determining module 103 is further configured to determine a fault root cause probability of the suspected fault root cause node according to the suspected fault root cause node, the fault type, the event related to the fault and the selected Bayes model.

According to the present disclosure, the node type at least include a fault root cause node and a fault propagation node. The second determining module 102 is further configured to take, when the node type of the node is the fault root cause node, the fault root cause node as the suspected fault root cause node, and determine, when the node type of the node is the fault propagation node, the suspected fault root cause node according to node attributes of the fault propagation node.

According to the present disclosure, the second determining module 102 is further configured to determine whether a rule attribute of the node is satisfied when the node type of the node is the fault propagation node and a verifiability attribute of the node is "verifiable". If the rule attribute is satisfied, the second determining module 102 is further configured to determine a next node relative to the node according to the selected fault propagation graph, determine a node type of the next node, and determine the suspected fault root cause node according to the node type of the next node. If the rule attribute is not satisfied, the second determining module 102 is further configured to stop determining the next node relative to the node. When the node type of the node is the fault propagation node and the verifiability attribute of the node is "unverifiable", the second determining module 102 is further configured to determine the next node relative to the node according to the selected fault propagation graph, determine the node type of the next node, and determine the suspected fault root cause node according to the node type of the next node.

According to the present disclosure, the device for determining a root cause of fault may further include a fault propagation graph generation module configured to acquire, from a preset database of knowledge and experience of operation and maintenance, fault information including: fault types, fault root cause types, events related to the fault types, and association relationships among the fault types, the fault root cause types and the events related to the fault types, and generate a fault propagation graph for each of the fault types according to the fault information, and the fault propagation graph is a knowledge graph of fault propagation.

According to the present disclosure, the device for determining a root cause of fault may further include a Bayesian model building module configured to build the Bayesian model according to the fault propagation graph.

According to the present disclosure, the Bayesian model building module is further configured to preprocess the fault propagation graph according to node attributes of each node in the fault propagation graph, and respectively convert all nodes and association relationships in the preprocessed fault propagation graph into nodes and association relationships in the Bayesian model, so as to build the Bayesian model.

According to the present disclosure, the Bayesian model building module is further configured to delete a node whose verifiability attribute is "unverifiable" in the fault propagation graph, delete association relationships related to the deleted node, and establish, according to the deleted association relationships, an association relationship between nodes associated with the deleted node.

The present disclosure further provides a server, including: one or more processors, and a storage device having one or more programs stored thereon. When the one or more programs are executed by the one or more processors, the one or more processors implement the above method for determining a root cause of fault.

The present disclosure further provides a computer-readable medium having a computer program stored thereon. When the computer program is executed, the above method for determining a root cause of fault is implemented.

It should be understood by those of ordinary skill in the art that the functional modules/units in all or some of the operations, and the devices in the methods disclosed above may be implemented as software, firmware, hardware, or suitable combinations thereof. If implemented as hardware, the division between the functional modules/units stated above is not necessarily corresponding to the division of physical components; for example, one physical component may have a plurality of functions, or one function or operation may be performed through cooperation of several physical components. Some or all of the physical components may be implemented as software executed by a processor, such as a central processing unit, a digital signal processor or a microprocessor, or may be implemented as hardware, or may be implemented as an integrated circuit, such as an application specific integrated circuit. Such software may be distributed on a computer-readable medium, which may include a computer storage medium (or a non-transitory medium) and a communication medium (or a transitory medium). As well known by those of ordinary skill in the art, the term "computer storage medium" includes volatile/nonvolatile and removable/non-removable media used in any method or technology for storing information (such as computer-readable instructions, data structures, program modules and other data). The computer storage medium includes, but is not limited to, a Random Access Memory (RAM), a Read-Only Memory (ROM), an Electrically Erasable Programmable Read-Only Memory (EEPROM), a flash memory or other memory techniques, a Compact Disc Read Only Memory (CD-ROM), a Digital Versatile Disc (DVD) or other optical discs, a magnetic cassette, a magnetic tape, a magnetic disk or other magnetic storage devices, or any other medium which can be configured to store desired information and can be accessed by a computer. In addition, it is well known by those of ordinary skill in the art that the communication media generally include computer-readable instructions, data structures, program modules, or other data in modulated data signals such as carrier wave or other transmission mechanism, and may include any information delivery medium.

The present disclosure discloses the exemplary embodiments using specific terms, but the terms are merely used and should be merely interpreted as having general illustrative meanings, rather than for the purpose of limitation. Unless expressly stated, it is apparent to those of ordinary skill in the art that features, characteristics and/or elements described in connection with a particular embodiment can be used alone or in combination with features, characteristics and/or elements described in connection with other embodiments. Therefore, it should be understood by those of ordinary skill in the art that various changes in the forms and the details can be made without departing from the scope of the present disclosure of the appended claims.

What is claimed is:

1. A method for determining a root cause of fault, comprising:
   determining fault characteristic information in response to a fault occurring in a service; and
   determining a fault root cause node according to the fault characteristic information and a preset fault propagation graph, wherein the fault propagation graph is configured to represent directed association relationships among different fault propagation nodes, and directed association relationships among a fault node, the fault propagation nodes and fault root cause nodes, and the nodes in the fault propagation graph are configured to represent the fault characteristic information.

2. The method of claim 1, wherein after determining the fault root cause node according to the fault characteristic information and the preset fault propagation graph, the method further comprises:
   determining a fault root cause probability of the fault root cause node according to the fault root cause node, the fault characteristic information and a preset Bayesian model.

3. The method of claim 2, wherein determining the fault characteristic information comprises:
   determining the service where the fault occurs and a fault type;
   determining a path of the service where the fault occurs; and
   acquiring an event related to the fault according to the path,
   determining the fault root cause node according to the fault characteristic information and the preset fault propagation graph comprises:
   selecting a fault propagation graph, a fault node in which is matched with the fault type, from the preset fault propagation graphs; and
   determining the fault root cause node according to the selected fault propagation graph, and
   determining the fault root cause probability of the fault root cause node according to the fault root cause node, the fault characteristic information and the preset Bayesian model comprises:
   selecting a Bayesian model corresponding to the selected fault propagation graph from the preset Bayesian models; and
   determining the fault root cause probability of the fault root cause node according to the fault root cause node, the fault type, the event related to the fault and the selected Bayesian model.

4. The method of claim 3, wherein determining the fault root cause node according to the selected fault propagation graph comprises:
determining a node associated with the fault node in the selected fault propagation graph according to association relationships in the selected fault propagation graph; and
determining a node type of the node; and
determining a suspected fault root cause node at least according to the node type, wherein the suspected fault root cause node is a fault root cause node in the selected fault propagation graph, and the number of suspected fault root cause nodes is less than that of fault root cause nodes in the selected fault propagation graph, and
determining the fault root cause probability of the fault root cause node according to the fault root cause node, the fault type, the event related to the fault and the selected Bayesian model comprises:
determining a fault root cause probability of the suspected fault root cause node according to the suspected fault root cause node, the fault type, the event related to the fault and the selected Bayesian model.

5. The method of claim 4, wherein determining the suspected fault root cause node at least according to the node type comprises:
in response to the node type of the node being a fault propagation node and a verifiability attribute of the node being "verifiable", determining whether a rule attribute of the node is satisfied;
in response to the rule attribute being satisfied, determining a next node relative to the node according to the selected fault propagation graph, determining a node type of the next node, and determining the suspected fault root cause node according to the node type of the next node; and in response to the rule attribute being not satisfied, stopping determining the next node relative to the node; and
in response to the node type of the node being the fault propagation node and the verifiability attribute of the node being "unverifiable", determining the next node relative to the node according to the selected fault propagation graph, determining the node type of the next node, and determining the suspected fault root cause node according to the node type of the node.

6. The method of claim 1, further comprising generating the fault propagation graph, which comprises:
acquiring, from a preset database of knowledge and experience of operation and maintenance, fault information comprising fault types, fault root cause types, events related to the fault types, and association relationships among the fault types, the fault root cause types and the events related to the fault types; and
generating a fault propagation graph for each of the fault types according to the fault information, wherein the fault propagation graph is a knowledge graph of fault propagation.

7. The method of claim 2, further comprising building the Bayesian model, which comprises:
deleting a node whose verifiability attribute is "unverifiable" in the fault propagation graph;
deleting association relationships related to the deleted node;
establishing, according to the deleted association relationships, an association relationship between nodes associated with the deleted node, so as to obtain a preprocessed fault propagation graph; and
respectively converting all nodes and association relationships in the preprocessed fault propagation graph into nodes and association relationships in the Bayesian model, so as to build the Bayesian model.

8. A device for determining a root cause of fault, comprising: a first determining module and a second determining module, wherein
the first determining module is configured to determine fault characteristic information in response to a fault occurring in a service; and
the second determining module is configured to determine a fault root cause node according to the fault characteristic information and a preset fault propagation graph, wherein the fault propagation graph is configured to represent directed association relationships among different fault propagation nodes, and directed association relationships among a fault node, the fault propagation nodes and fault root cause nodes, and the nodes in the fault propagation graph are configured to represent the fault characteristic information.

9. The device for determining a root cause of fault of claim 8, further comprising a third determining module configured to determine a fault root cause probability of the fault root cause node according to the fault root cause node, the fault characteristic information, and a preset Bayesian model.

10. The device for determining a root cause of fault of claim 9, wherein the first determining module is further configured to determine the service where the fault occurs and a fault type, determine a path of the service where the fault occurs, and acquire an event related to the fault according to the path;
the second determining module is further configured to select a fault propagation graph, a fault node in which is matched with the fault type, from the preset fault propagation graphs, and determine the fault root cause node according to the selected fault propagation graph; and
the third determining module is further configured to select a Bayesian model corresponding to the selected fault propagation graph from the preset Bayesian models, and determine the fault root cause probability of the fault root cause node according to the fault root cause node, the fault type, the event related to the fault and the selected Bayesian model.

11. The device for determining a root cause of fault of claim 10, wherein the second determining module is further configured to determine a node associated with the fault node in the selected fault propagation graph according to association relationships in the selected fault propagation graph, determine a node type of the node, and determine a suspected fault root cause node at least according to the node type, wherein the suspected fault root cause node is a fault root cause node in the selected fault propagation graph, and the number of suspected fault root cause nodes is less than that of fault root cause nodes in the selected fault propagation graph; and
the third determining module is further configured to determine a fault root cause probability of the suspected fault root cause node according to the suspected fault root cause node, the fault type, the event related to the fault and the selected Bayesian model.

12. The device for determining a root cause of fault of claim 11, wherein the second determining module is further configured to determine whether a rule attribute of the node is satisfied in response to the node type of the node being a fault propagation node and a verifiability attribute of the node being "verifiable";

in response to the rule attribute being satisfied, the second determining module is further configured to determine a next node relative to the fault propagation node according to the selected fault propagation graph, determine a node type of the next node, and determine the suspected fault root cause node according to the node type of the next node;

in response to the rule attribute being not satisfied, the second determining module is further configured to stop determining the next node relative to the fault propagation node;

in response to the node type of the node being the fault propagation node and the verifiability attribute of the node being "unverifiable", the second determining module is further configured to determine the next node relative to the fault propagation node according to the selected fault propagation graph, determine the node type of the next node, and determine the suspected fault root cause node according to the node type of the next node.

13. The device for determining a root cause of fault of claim 8, further comprising a fault propagation graph generation module configured to acquire, from a preset database of knowledge and experience of operation and maintenance, fault information comprising fault types, fault root cause types, events related to the fault types, and association relationships among the fault types, the fault root cause types and the events related to the fault types, and generate a fault propagation graph for each of the fault types according to the fault information, wherein the fault propagation graph is a knowledge graph of fault propagation.

14. The device for determining a root cause of fault of claim 9, further comprising a Bayesian model building module configured to delete a node whose verifiability attribute is "unverifiable" in the fault propagation graph, delete association relationships related to the deleted node, establish, according to the deleted association relationships, an association relationship between nodes associated with the deleted node, so as to obtain a preprocessed fault propagation graph, and respectively convert all nodes and association relationships in the preprocessed fault propagation graph into nodes and association relationships in the Bayesian model, so as to build the Bayesian model.

15. A server, comprising:

one or more processors; and a storage device having one or more programs stored thereon, wherein, when the one or more programs are executed by the one or more processors, the one or more processors perform the method for determining a root cause of fault of claim 1.

16. A non-transitory computer-readable medium having a computer program stored thereon, wherein, when the computer program is executed by a processor, the processor performs the method for determining a root cause of fault of claim 1.

* * * * *